United States Patent
Collier-Hallman

[19]

[11] Patent Number: 5,967,253
[45] Date of Patent: Oct. 19, 1999

[54] ELECTRO-HYDRAULIC POWER STEERING CONTROL WITH MOTOR SPEED SWITCHING AND FLUID TEMPERATURE COMPENSATION OF STANDBY SWITCH-POINTS

[75] Inventor: Steven James Collier-Hallman, Frankenmuth, Mich.

[73] Assignee: General Motors Corporation, Detroit, Mich.

[21] Appl. No.: 08/962,194

[22] Filed: Oct. 31, 1997

[51] Int. Cl.⁶ .................................................. B62D 5/06
[52] U.S. Cl. ............................................. 180/421; 701/41
[58] Field of Search .................................. 180/421, 422; 701/41, 42

[56] References Cited

U.S. PATENT DOCUMENTS

| | | | |
|---|---|---|---|
| 4,753,308 | 6/1988 | Noto et al. | 180/421 |
| 5,558,177 | 9/1996 | Inaguma et al. | 180/422 |
| 5,564,516 | 10/1996 | Nimblett, Jr. et al. | 180/423 |
| 5,762,159 | 6/1998 | Matsuoka et al. | 180/422 |
| 5,839,398 | 11/1998 | Hamilton | 123/44.33 |

FOREIGN PATENT DOCUMENTS

| | | | |
|---|---|---|---|
| 0 053 297 A1 | 10/1981 | European Pat. Off. | B62D 5/06 |
| 36 22 217 A1 | 1/1988 | Germany | B62D 5/06 |
| 44 18 118 C1 | 7/1995 | Germany | B62D 5/04 |
| 2 289 657 | 11/1995 | United Kingdom | B62D 5/06 |
| 95/11152 | 4/1995 | WIPO | B62D 5/06 |

*Primary Examiner*—Lanna Mai
*Assistant Examiner*—Andrew J. Fischer
*Attorney, Agent, or Firm*—Robert M. Sigler

[57] ABSTRACT

A vehicle power steering system uses an electric motor to drive a pump at a variable speed to provide power steering fluid at a variable flow for power assist to operator steering efforts. The system has a speed control for the electric motor which derives a command speed signal from a power steering load signal, senses motor speed and controls electric power to the motor in response thereto to vary the speed of the electric motor in the direction of the command speed signal. In a switching region of the power steering fluid pressure signal, the speed control switches between a low speed for standby operation and a higher speed to supply the power steering operation demands. The speed control modifies the switch-point load value in response to the power steering fluid temperature sensor to compensate for temperature dependent losses. Separate switch-points are preferably provided for increasing and decreasing power steering load to provide hysteresis; and both switch-points are preferably compensated.

5 Claims, 10 Drawing Sheets

ELECTRO-HYDRAULIC POWER STEERING CONTROL WITH MOTOR SPEED SWITCHING AND FLUID TEMPERATURE COMPENSATION OF STANDBY SWITCH-POINTS

TECHNICAL FIELD

The technical field of the invention is vehicle power steering systems, and particularly such systems in which fluid power is provided by an electric motor driven pump.

BACKGROUND OF THE INVENTION

In a vehicle power steering system, a pump provides power steering fluid at an elevated pressure for power assist to the vehicle operator in turning a hand-wheel to steer the vehicle. Most such systems use the vehicle engine itself, through a pulley and belt arrangement, to drive the pump. However, it is also known to use an electric motor to drive the pump independently of the vehicle engine in an electro-hydraulic power steering system; and this allows the pump to be driven at a lower speed for significant energy savings when no power assist is required, such as when the vehicle is proceeding in a straight line or is standing still.

A basic arrangement for an electro-hydraulic power steering system is described in European Patent Application 0053297 A1, published Jun. 9, 1982. The publication describes a pump 4 driven by an electric motor 6, with operating current provided from a battery 11 under control of a power regulator 12. Demand for power assist is indicated by a counter-pressure of the power steering fluid, which increases motor load and thus motor current. A controller 8 varies electric power to motor 6 in response to a motor current sensor 7 as required to meet the demand.

However, the basic premise of this system—that the power steering load is represented by the electric current in the pump driving motor or the hydraulic pressure at the pump outlet—is only approximately true. A portion of the motor's power is used to overcome losses in the pump/motor assembly and the fluid conduits of the power steering system. These losses include eddy current and hysteresis losses in the motor, viscous and Coulomb friction in the motor and pump, and viscous losses in the hoses, control valve and gear; and they vary significantly with the temperature of the power steering fluid and the rotational speed of the electric motor, which is preferably submerged with the pump in the power steering reservoir. Over a large range of power steering load such inaccuracy presents little problem, particularly if the controller provides closed loop control of motor speed. However, in a switching region at the low end of the full range of power steering load, where the motor and pump are switched between a low speed standby mode for energy savings when minimal power assist is required and the significantly higher motor speed required for high power assist, greater accuracy is required.

In the switching region, two requirements for such a power steering system compete with each other. The pump motor is preferably switched from low speed standby to a high speed at a low value of power steering load to avoid "pump catch," in which the pump does not provide sufficient flow soon enough to meet a quickly increasing demand from the power steering system. However, the lower the switch-point, the less time will be spent in standby and the lower will be the energy savings achieved. Thus, the switch point must be carefully chosen to provide the best combination of benefits in view of these two competing considerations.

The use of hysteresis in the switching prevents unnecessary cycling but also aggravates the problem in the selection of switch points, since such hysteresis requires that the upward switch point, which is desirably low, be greater than the downward switch point, which is desirably high The design of the power steering system is thus a compromise which provides carefully chosen, specific switch points to achieve the best combination of benefits for a particular vehicle. This combination of benefits will not be achieved, however, without significant accuracy in the operation of the system relative to these specific switch points; and this requires accuracy in the switching region in the derivation of power steering fluid pressure from the pump motor current.

SUMMARY OF THE INVENTION

The vehicle power steering system described and claimed herein uses an electric motor to drive a pump at a variable speed to provide power steering fluid at a variable flow to meet power steering operational demands. The system has sensor apparatus for providing a power steering load signal and a speed control for the electric motor which is responsive to the power steering load signal to provide a command speed signal switching at a switch-point load value in a switching region of the power steering load signal between a low speed for standby operation and a higher speed to supply the power steering operation demands.

The speed control is also responsive to a power steering fluid temperature sensor to modify the switch-point load value to compensate for temperature dependent losses. It further comprises apparatus for sensing motor speed and controlling electric power to the motor in response thereto to vary the speed of the electric motor in the direction of the command speed signal. The modification of the switch-point load value in response to power steering fluid temperature provides greater accuracy in switching in and out of standby to obtain the desired combination of benefits described above. In a preferred embodiment, a pair of switch-points are provided for hysteresis; and both switch-points are compensated.

DESCRIPTION OF THE PREFERRED EMBODIMENT

Figure 1:
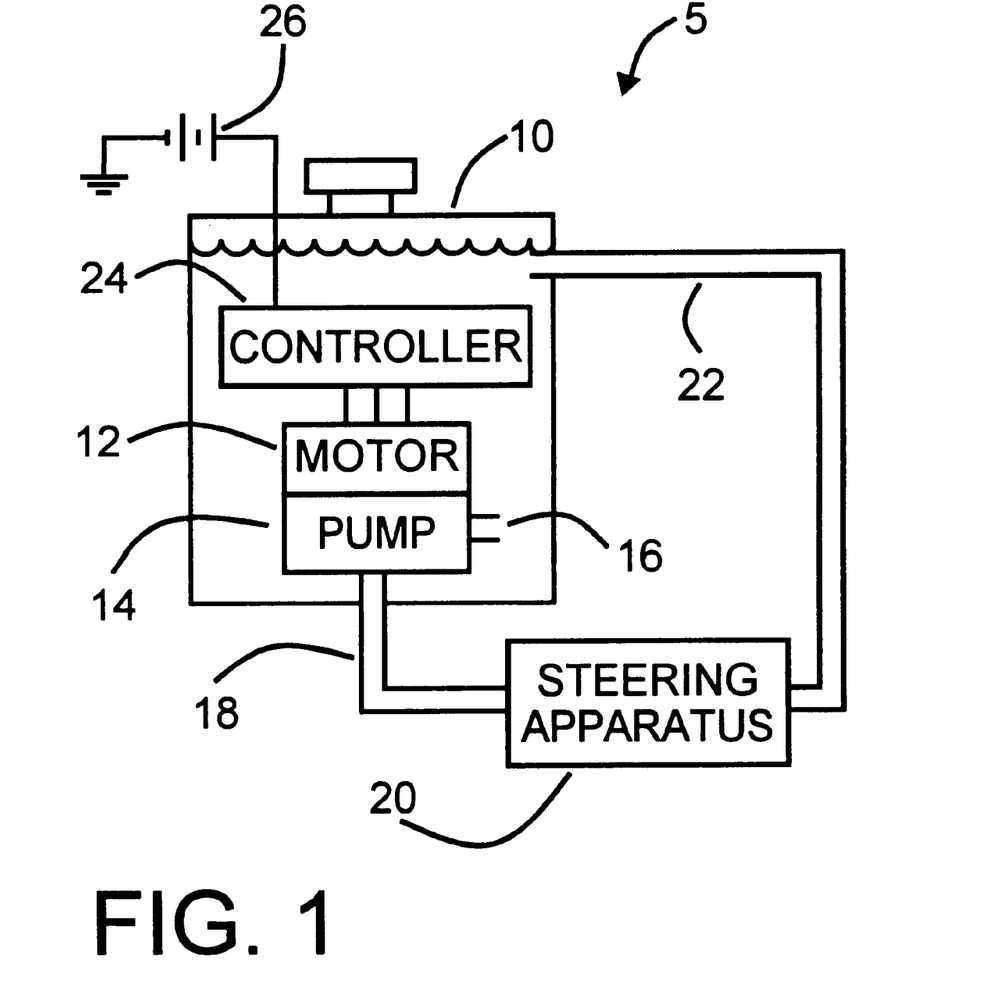
FIG. 1 is an overall block diagram of a vehicle electro-hydraulic power steering (EHPS) system according to the invention.

FIG. 1 is a block diagram of an electro-hydraulic power steering (EHPS) system 5 in a motor vehicle. A housing 10 comprises a reservoir for power steering fluid as well as a container for system components. Within housing 10, an electric motor 12 drives a power steering fluid pump 14, the latter having an intake 16 and being effective to provide power steering fluid under pressure through a pump outlet conduit 18 to a power steering apparatus 20 having conventional means, such as that shown in U.S. Pat. No. 3,022,772 to Ziegler, issued Feb. 27, 1962 or U.S. Pat. No. 4,454,801 to Spann, issued Jun. 19, 1984, for example, to use the pressure of the power steering fluid to provide a power steering assist. A return conduit 22 returns power steering fluid from steering apparatus 20 to housing 10. A controller 24 is located within housing 10 and is generally submerged in the power steering fluid therein along with motor 12 and pump 14. A conventional vehicle DC power source, symbolized by battery 26, provides electric power to controller 24 to generate operating voltage and current for motor 12.

Figure 2:
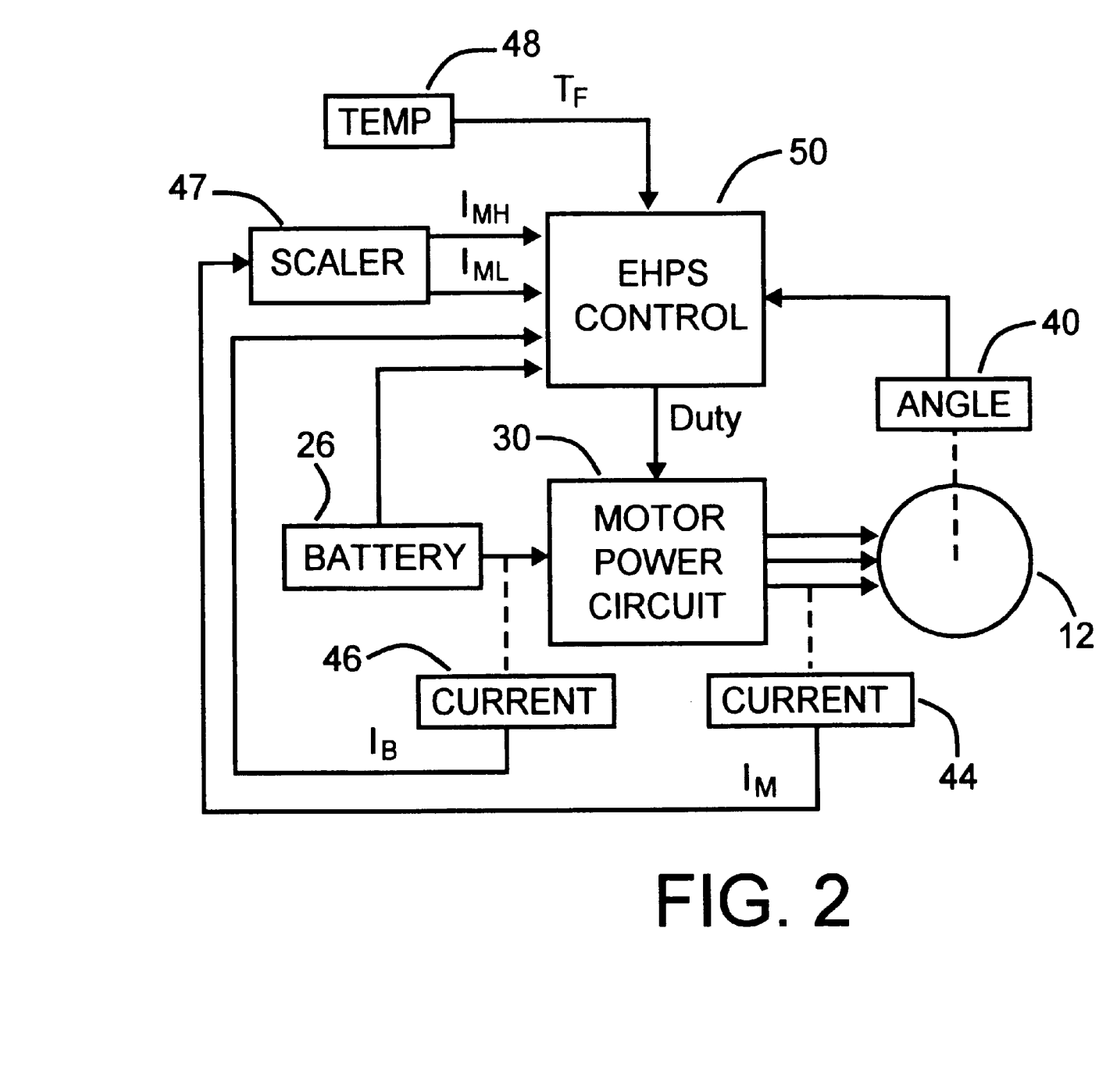
FIG. 2 is a block diagram of an electric power and control system for an electric motor used to drive a power steering pump in the system of FIG. 1.

FIG. 2 shows a block diagram of controller 24, together with battery 26 and motor 12. A motor power circuit 30 receives the electric power from DC electric power source 26 and provides current to motor 12, which is preferably a three-phase, brushless DC motor. EHPS control 50 provides a control signal Duty to motor power circuit 30 in response to input signals from a motor angle (position) sensor 40 ($\theta_M$), a motor current sensor apparatus 44 ($I_M$) and a battery current sensor 46 ($I_B$), as well as operating voltage from DC electric power source 26. EHPS control 50 further receives a power steering fluid temperature signal $T_F$ from a temperature sensor 48, which can be located on a submerged part of controller 24.

In the electro-hydraulic power steering system of this apparatus, the power steering fluid pressure in pump outlet conduit 18 is proportional to the torque output of the electric motor, which is proportional to the motor current. It is convenient and less costly to sense the motor as a power steering load signal for application to EHPS control 50. However, the signal indicating motor current must have a high resolution at low values as well as an extended range of low to high values to cover the full range of operational control. Controller 24 is provided with a digital computer and signal input apparatus including an A/D converter. If the A/D converter has sufficient resolution to handle the high resolution at a low value while encompassing the full range of low to high values, the motor current signal $I_M$ can be converted therein and used as a single signal. However, significant cost can be saved by using an A/D converter with lower resolution; and in this preferred embodiment, the motor current signal $I_M$ is scaled by SCALER 48 into both high gain ($I_{MH}$) and low gain ($I_{ML}$) signals, with the high gain signal $I_{MH}$ used for high resolution at the low values and the low gain signal $I_{ML}$ used when the full range of values is required.

Figure 3:
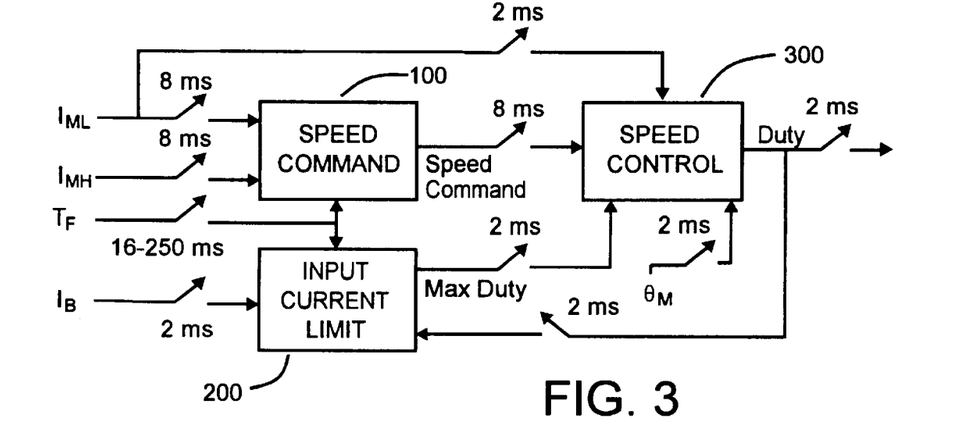
FIG. 3 is a functional block diagram of the EHPS control shown in FIG. 2.

FIG. 3 is a functional block diagram of EHPS Control 50. The diagram shows three functional blocks: SPEED COMMAND 100, INPUT CURRENT LIMIT 200, and SPEED CONTROL 300, with input and output connections, interconnections and indicated sample times for each connection.

SPEED COMMAND 100 determines a desired motor speed from the two input current signals—$I_{MH}$ and $I_{ML}$—sampled with a period of 8 ms and Temperature $T_F$ sampled with a period of 16 to 250 ms. The desired motor speed is output as a signal Speed Command.

INPUT CURRENT LIMIT 200 determines a voltage signal corresponding to a maximum input current based on temperature, to limit the drain on the electric power supply. It is provided with inputs of battery current $I_B$ at a sample period of 2 ms, Temperature $T_F$ at a sample period of 16 to 250 ms and the controller output signal Duty with a sample period of 2 ms. Its own output signal Max Duty specifies a duty cycle producing the maximum allowable input current.

SPEED CONTROL 300 uses proportional plus integral control to determine the commanded motor duty cycle from the desired motor speed and maximum input current and includes anti-wind-up. It receives the output signal Speed Command from SPEED COMMAND 100, with a sample period of 8 ms, the output signal Max Duty from INPUT CURRENT LIMIT 200, the input motor current signal $I_{ML}$, and the motor position signal $\theta_m$, each of the latter three with a sample period of 2 ms. The block's output signal Duty is provided as the output of EHPS control 50 and in feedback to INPUT CURRENT LIMIT 200 with sample periods of 2 ms.

Figure 13:
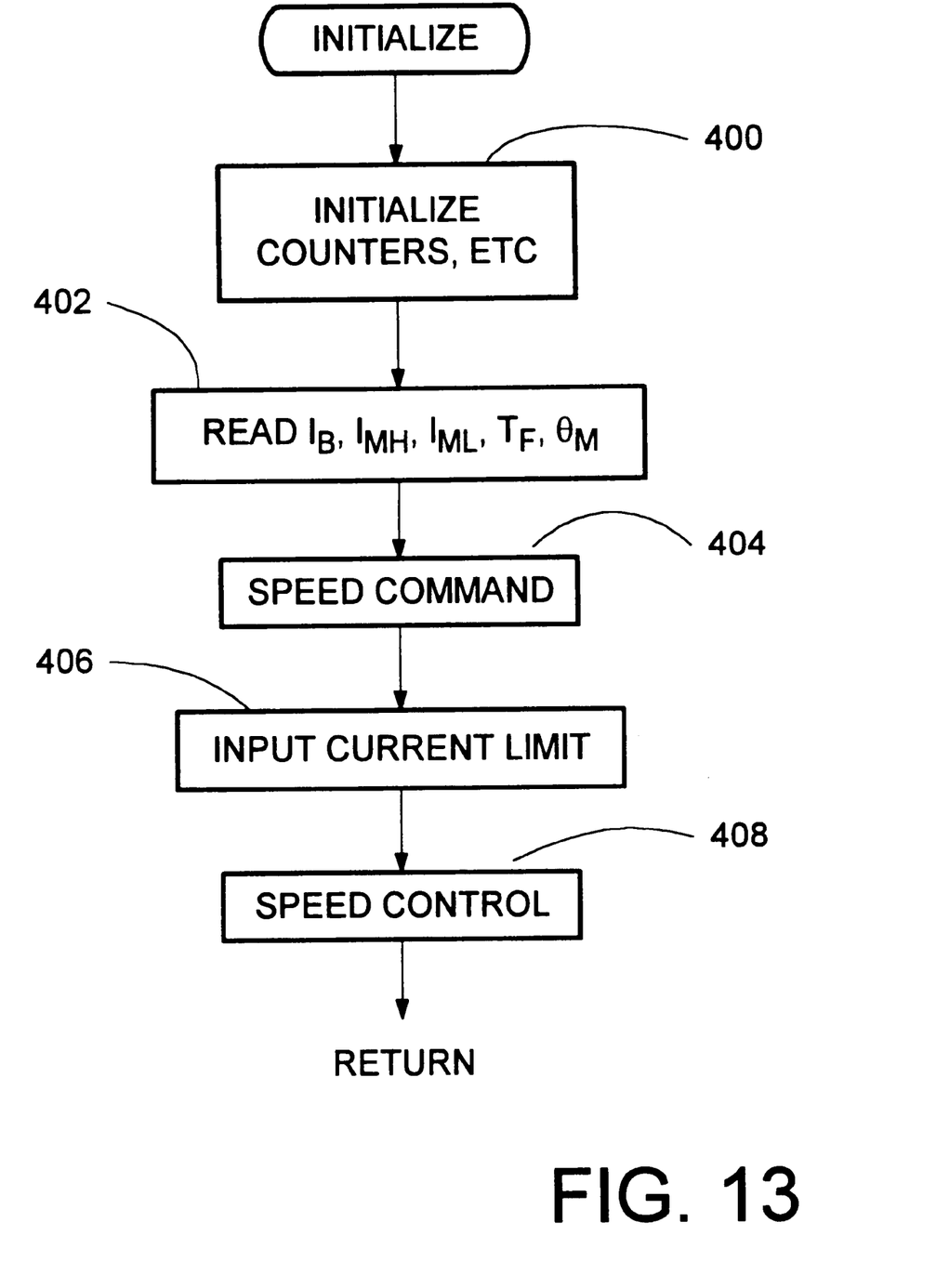
FIGS. 13–14 show computer flow charts derived from and equivalent to the EHPS control of FIG. 3
Figure 14:
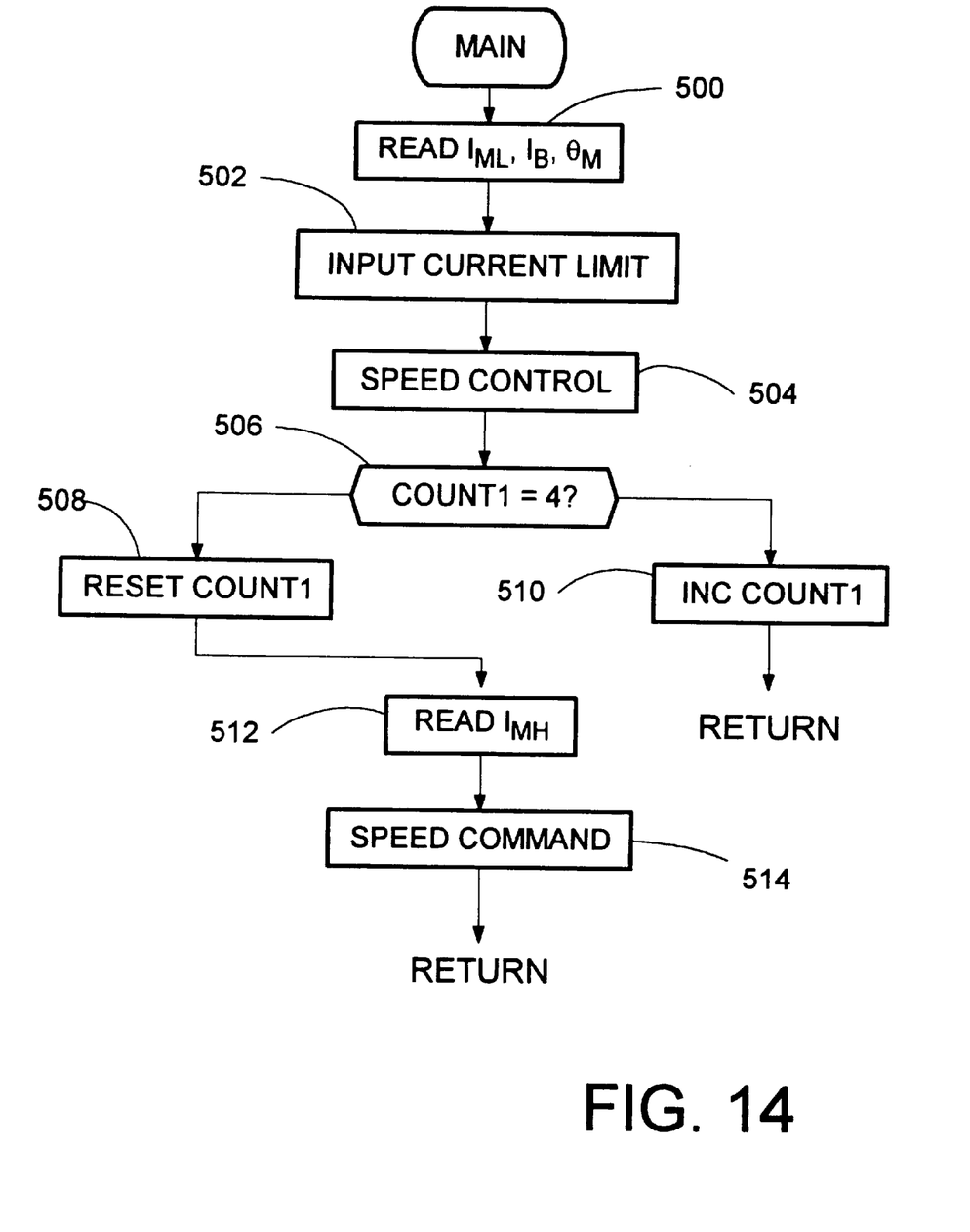

An equivalent representation of FIG. 3, in standard computer flow chart form, is seen in FIGS. 13 and 14, for use in a preferred digital computer embodiment. A routine INITIALIZE (FIG. 13) is run once; and a routine MAIN (FIG. 14) is then run repeatedly every 2 milliseconds. Routine INITIALIZE begins in step 400 by initializing all counters, etc. In step 402, the routine reads all inputs. In steps 404–408, the routine performs subroutines SPEED COMMAND, INPUT CURRENT LIMIT, and SPEED CONTROL, respectively, which subroutines correspond to the similarly named functional blocks of FIG. 3, in order to obtain an initial value of Duty. Each functional block which is a sub-unit of one of those listed in the preceding sentence comprises another subroutine organized in a hierarchy as described herein.

Routine MAIN begins in step 500 by reading the inputs which are to be sampled every 2 milliseconds: $I_{ML}$, $I_B$ and $\theta_M$. Next, in steps 502 and 504, the routine calls subroutines INPUT CURRENT LIMIT and SPEED CONTROL, respectively, to provide new values of outputs Max Duty and Duty every 2 milliseconds. Finally, in steps 506–510, the routine manages a counter COUNT1 which provides for input $I_{MH}$ to be read in step 512 and subroutine SPEED COMMAND to be run in step 514 once every four times routine MAIN is run: that is, every 8 milliseconds. Provision may preferably be made for an interrupt routine to read input $T_F$ every 16–250 milliseconds.

Figure 4:
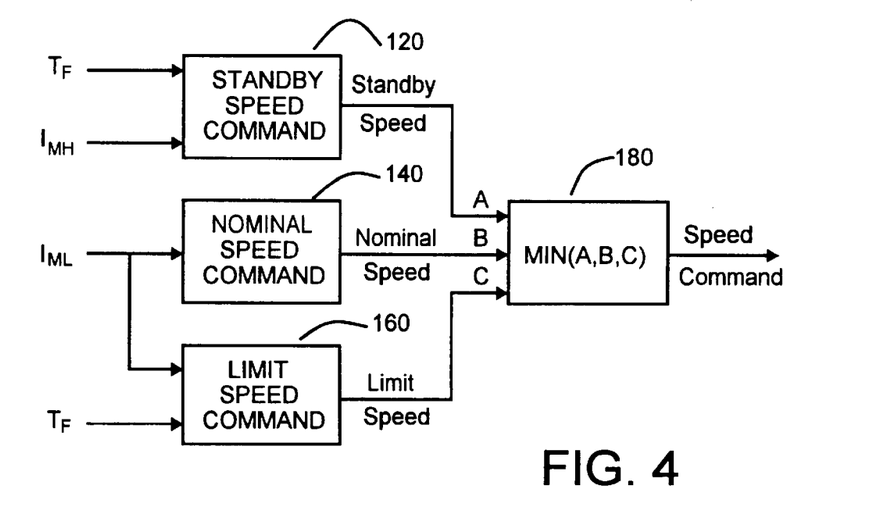
FIG. 4 shows further details of the SPEED COMMAND block in the EHPS control of FIG. 3.
Figure 9:
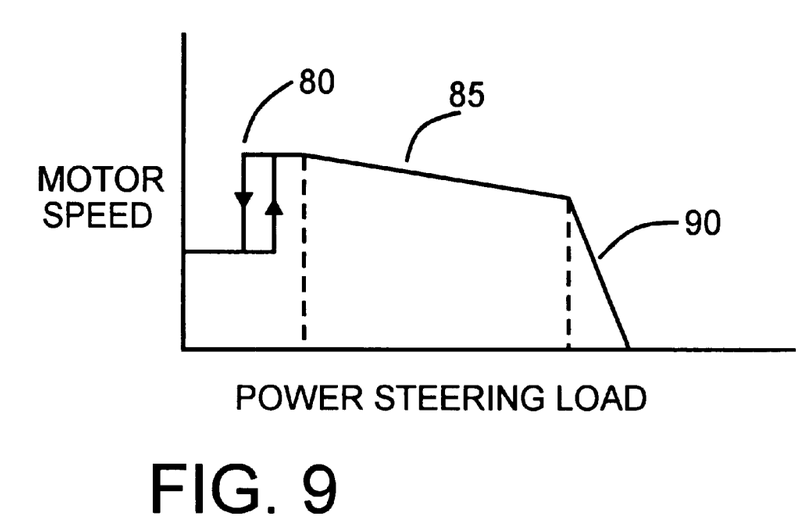
FIG. 9 shows a plot of desired motor speed as a function of power steering load for the SPEED COMMAND block of FIG. 4–8.

SPEED COMMAND 100 is shown in more detail in FIG. 4. This functional block derives a standby speed, a nominal speed and a limit speed, each according to a different algorithm, and chooses the lowest of the three as the output signal Speed Command. Thus, the input temperature signal $T_F$ and current signal $I_{MH}$ are provided to a functional block STANDBY SPEED COMMAND 120, in which an output signal Standby Speed is derived; current signal $I_{ML}$ is provided to a functional block NOMINAL SPEED COMMAND 140, in which an output signal Nominal Speed is derived; and the temperature signal $T_F$ and current signal $I_{ML}$ are provided to a functional block LIMIT SPEED COMMAND 160, in which an output signal Limit Speed is derived. These output signals are provided as inputs A, B and C to a functional block MIN(A,B,C) 180 to derive the output signal Speed Command. Functional block MIN(A, B,C) 180 chooses the minimum value of the signals Standby Speed, Nominal Speed and Limit Speed and thus provides an output signal Speed Command according to an overall curve such as that shown in FIG. 9, wherein STANDBY SPEED COMMAND 120 controls switching between a low standby speed and a higher nominal speed in a switching region 80 including the lowest values of power steering load, NOMINAL SPEED COMMAND 140 controls across the wide nominal range 85 of power steering load, and LIMIT SPEED 160 controls in a limit region 90.

Figure 5:
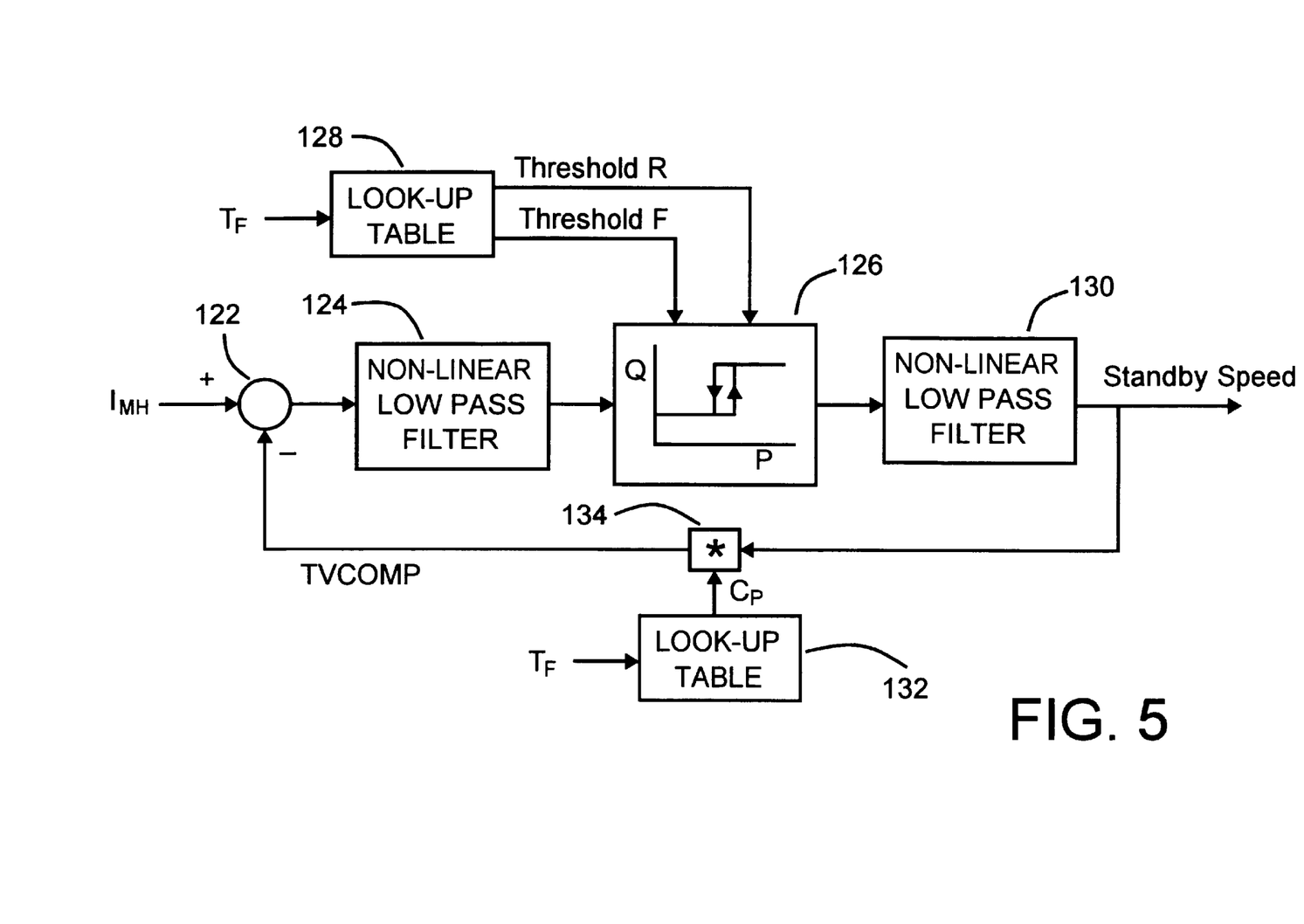
FIG. 5 shows further details of the STANDBY SPEED COMMAND block in the diagram of FIG. 4.

STANDBY SPEED COMMAND 120 is described in more detail in FIG. 5. Since this functional block deals with the low end of the power steering load scale, and thus with low values of motor current, the high gain signal $I_{MH}$ is used for motor current. Signal $I_{MH}$ is provided to a summing block 122 in which a compensation value TVCOMP, described below, is subtracted. The output of summing block 122, which is an estimate of power steering load derived from motor current and compensated for power steering fluid temperature and motor speed, is provided to a non-linear low pass filter 124, the output of which is provided as one input to a function generator 126. The purpose of non-linear low pass filter 124 is to provide different time constants for increasing and decreasing values of the power steering load. A fast time constant is provided for increasing motor current, so as to provide quick switching out of standby, although it is limited to prevent such switching on noise. A slower time constant is provided for decreasing motor current in order to prevent switching back into standby after an initial high demand spike of a quick hand-wheel movement, although it is fast enough to prevent light steering feel after the end of the movement. The filter itself will be described below.

Function generator 126 provides an output Q as a step function of the input P, with hysteresis determined by a value Threshold F for decreasing values of input P and a value Threshold R for increasing values of input P. Function generator 126 controls the switching of electric motor 12 between standby and high speed operation. The values of Threshold R and Threshold F are obtained from a lookup table 128 as functions of the power steering fluid temperature signal $T_F$ provided thereto as an input. The specific values of Threshold F and Threshold R are calibrated for a particular vehicle system, but generally the value of Threshold R, the switch point for increasing pressure, is greater than that of Threshold F, the switch point for decreasing pressure, and both increase with the input temperature signal. The variation of the switching values Threshold R and Threshold F provides compensation of the switch-points in and out of Standby for fluid temperature varying losses in the apparatus inherent in the representation of power steering load by the motor current signal $I_{MH}$, or alternatively by pump outlet pressure.

The output Q of function generator 126 is provided to another non-linear low pass filter 130, the output of which is signal Standby Speed. This non-linear low pass filter provides different time constants for increasing and decreasing commanded motor speed for motor slew rate control, to aid tuning the system for a desired steering feel associated with switching in and out of standby.

The temperature input is also provided to a lookup table 132, the output Cp of which is a temperature compensation factor which is multiplied by signal Standby Speed in a multiplier 134, with the product comprising the compensation value TVCOMP subtracted from $I_{MH}$ in block 122, as described above. Thus, power steering fluid temperature and motor speed compensation are provided to the input value of motor current $I_{MH}$, to compensate for the temperature and motor speed dependent losses previously described. Since the switching in and out of Standby is the action most requiring accuracy, either the compensation of the switch-point pressure values or the compensation of the input current may be used, and the use of both as described herein provides additional flexibility in control. An alternate embodiment uses actual measured motor speed rather than the derived value Standby Speed for this compensation, but it also introduces time delay due to the low pass filtering used in the derivation of the actual motor speed signal from a sensed motor rotational position. The use of commanded speed as described herein is preferred due to its faster response.

Figure 6:
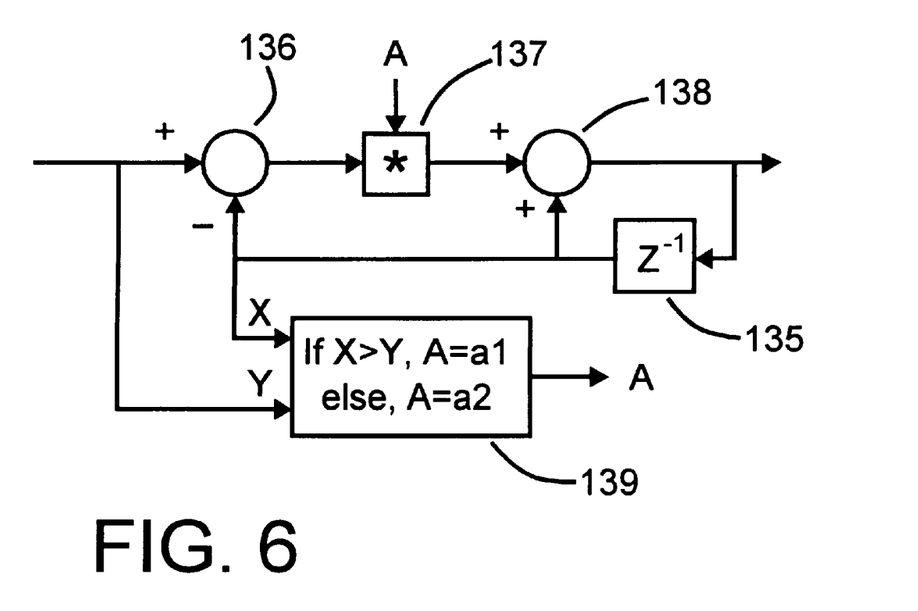
FIG. 6 shows further details of the NON-LINEAR LOW PASS FILTER blocks in the diagram of FIG. 5.

Non-linear low pass filters 124 and 130 may each be described with reference to FIG. 6. The output signal is delayed one period in a delay block 135 and subtracted from the input in a summing block 136. The output of summing block 136 is multiplied by a selectable factor A in multiplier 137 and added to the output of delay block 135 in a summing block 138 to provide the filter output. The output of delay block 135 is compared with the input value to the filter in a comparator 139, with the value of A being chosen as either of calibratable values a1 or a2, depending on which of the compared values is greater, that is, whether the input to the filter is increasing or decreasing. Thus, the output provides a first order low pass filter with different time constants for increasing and decreasing input. Values of a1 and a2 will be derived for a specific vehicle and performance criteria for each of filters 124 and 130.

Figure 7:
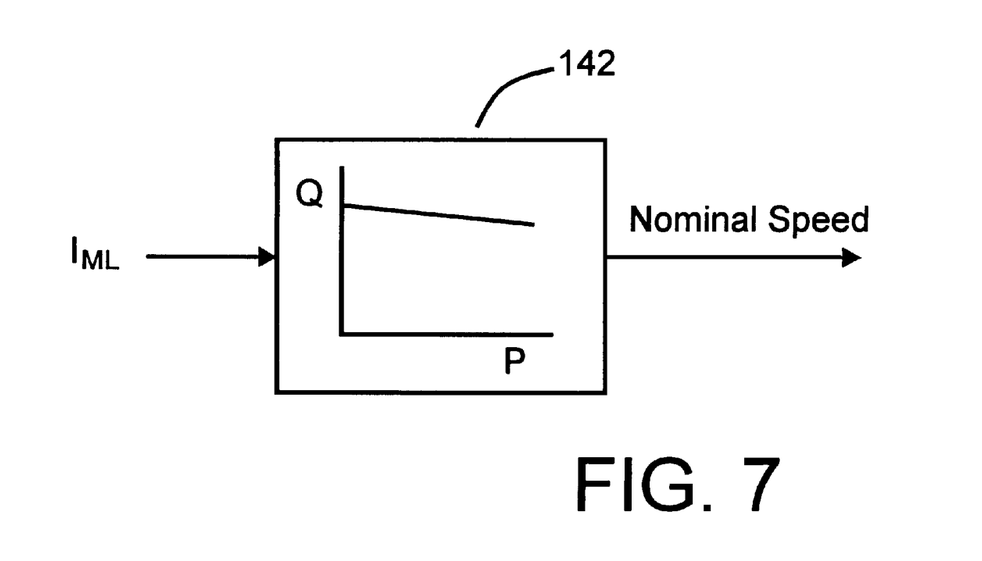
FIG. 7 shows further details of the NOMINAL SPEED COMMAND block in the diagram of FIG. 4.

NOMINAL SPEED COMMAND 140 is described with reference to FIG. 7. It determines the desired motor speed through the center range of power steering load. Input $I_{ML}$ is provided to a function generator 142, in which output Q is derived as a slightly decreasing linear function of input P, with the output Q comprising output signal Nominal Speed. This portion of SPEED COMMAND 100 provides a commanded speed across the great range of power steering load (whether motor current or power steering fluid pressure) between a low value just above the standby switch points and the high values where limiting begins. Since motor speed is subject to closed loop control, the need for accuracy is not as great as is required for the switching to and from standby; and the low gain motor current signal $I_{ML}$ is an appropriate input for the large range of current involved.

Figure 8:
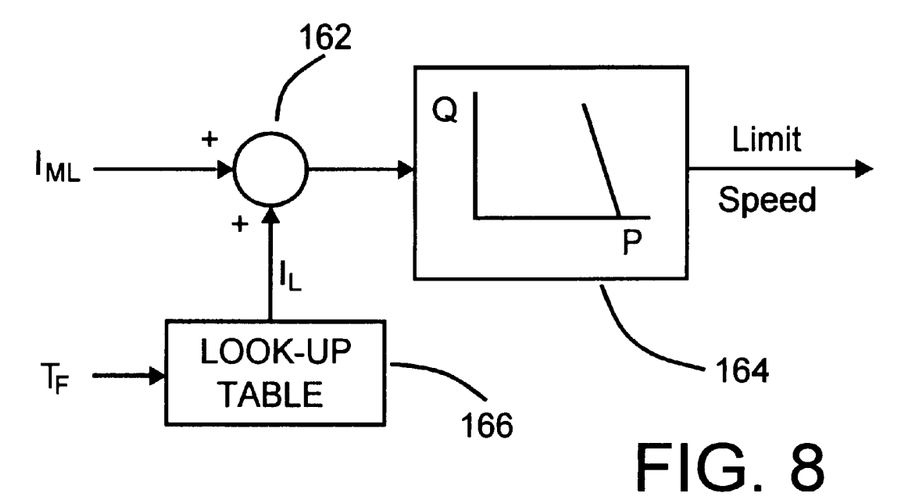
FIG. 8 shows further details of the LIMIT SPEED COMMAND block in the diagram of FIG. 4.

PRESSURE RELIEF SPEED COMMAND 160 is described with reference to FIG. 8. It provides a "soft shutdown" of the motor as the motor current reaches its maximum allowable value to prevent destruction of the power semiconductor switches from overheating. Input signal $I_{ML}$ is provided to a summing block 162, the output of which is provided as the input to a function generator 164 in which the output Q is a decreasing linear function of the input P. The input power steering temperature signal $T_F$ is provided to a lookup table 166, which provides an output value $I_L$ as the other input to summing block 162. The lookup table values are generally higher at high temperatures so as to effectively shift the limit curve in the direction of lower pressure as temperature rises. Output Q is provided as the signal Limit Speed. Thus, the transistors are shut down gradually with increasing load in anticipation of their temperature reaching its maximum allowable value. The use of the power steering fluid temperature signal is convenient and sufficiently accurate, since the heat sink(s) of the transistors are preferably submerged in the power steering fluid and cooled thereby. However, it is also possible, in an alternate embodiment, to provide a separate temperature sensor or sensors on the transistor heat sink(s) or the transistors themselves. In addition, the function could alternatively be performed in the motor power circuit.

Figure 10:
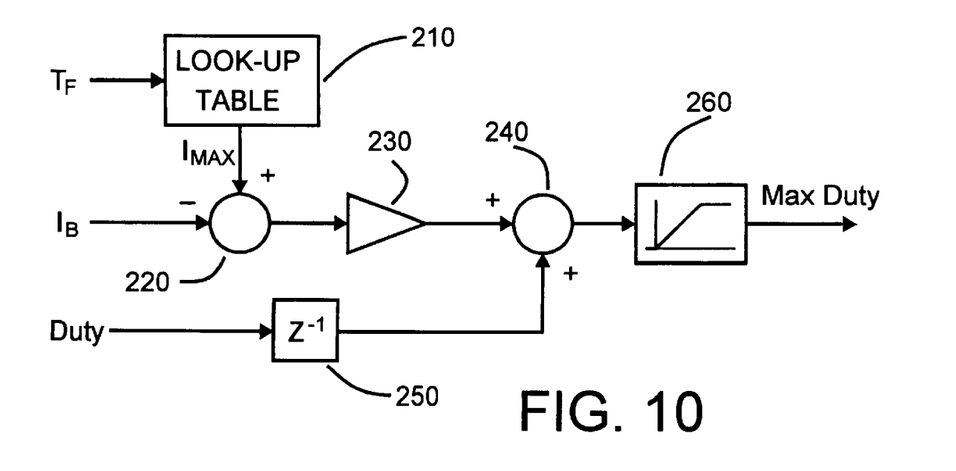
FIG. 10 shows further details of the INPUT CURRENT LIMIT block in the EHPS control of FIG. 3.

INPUT CURRENT LIMIT 200 is described with reference to FIG. 10. This function is present to prevent the power steering system from taking too much of the capacity of the electric power supply and thus limits input or battery current as a function of temperature $T_F$. It should be noted that it is input or battery current $I_B$, and not motor current, which is the input to this limiter. Since the motor is controlled in a switching mode, the battery current and motor current are not identical. The input temperature signal $T_F$ is provided to a lookup table 210, which outputs a maximum current value $I_{MAX}$ as a decreasing function thereof. Signal $I_{MAX}$ is provided as a positive input to a summing block 220, to which input signal $I_B$ is provided as a negative input. The output of summing block 220 is scaled by a factor R in amplifier 230 and the scaled value is provided to a summing block 240. The input signal Duty is provided through a delay block 250 to the other input of summing block 240, the output of which is limited between 0 and 100 percent in a limiter 260 and provided as output signal Max Duty, indicative of a maximum average voltage corresponding to a maximum allowed motor current.

Figure 11:
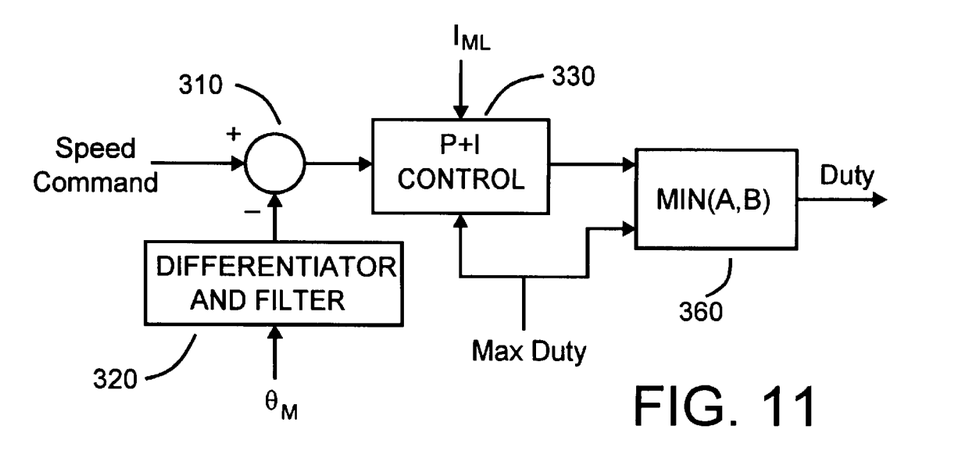
FIG. 11 shows further details of the SPEED CONTROL block in the EHPS control of FIG. 3.

SPEED CONTROL 300 is described with reference to FIG. 11. Signal Speed Command from SPEED COMMAND 100 is provided as a positive input to summing block 310. Input signal $\theta_M$ is provided to a macro block DIFFERENTIATOR AND FILTER 320, the output of which is a signal $\omega_M$ representing actual motor speed, which is provided as a negative input to summing block 310. Such circuits and computer algorithms for differentiating and low pass filtering a signal to obtain its rate of change are well known. The output of summing block 310 is therefore a speed error signal, which is provided to a functional block P+I CONTROL 330. The latter control has anti-wind-up limiting responsive to signals Max Duty from INPUT CURRENT LIMIT 200 and input current $I_{ML}$. The output of P+I CONTROL 330 is provided, along with signal Max Duty, to a functional block MIN(A,B) 360, which chooses the minimum and outputs it as signal Duty.

Figure 12:
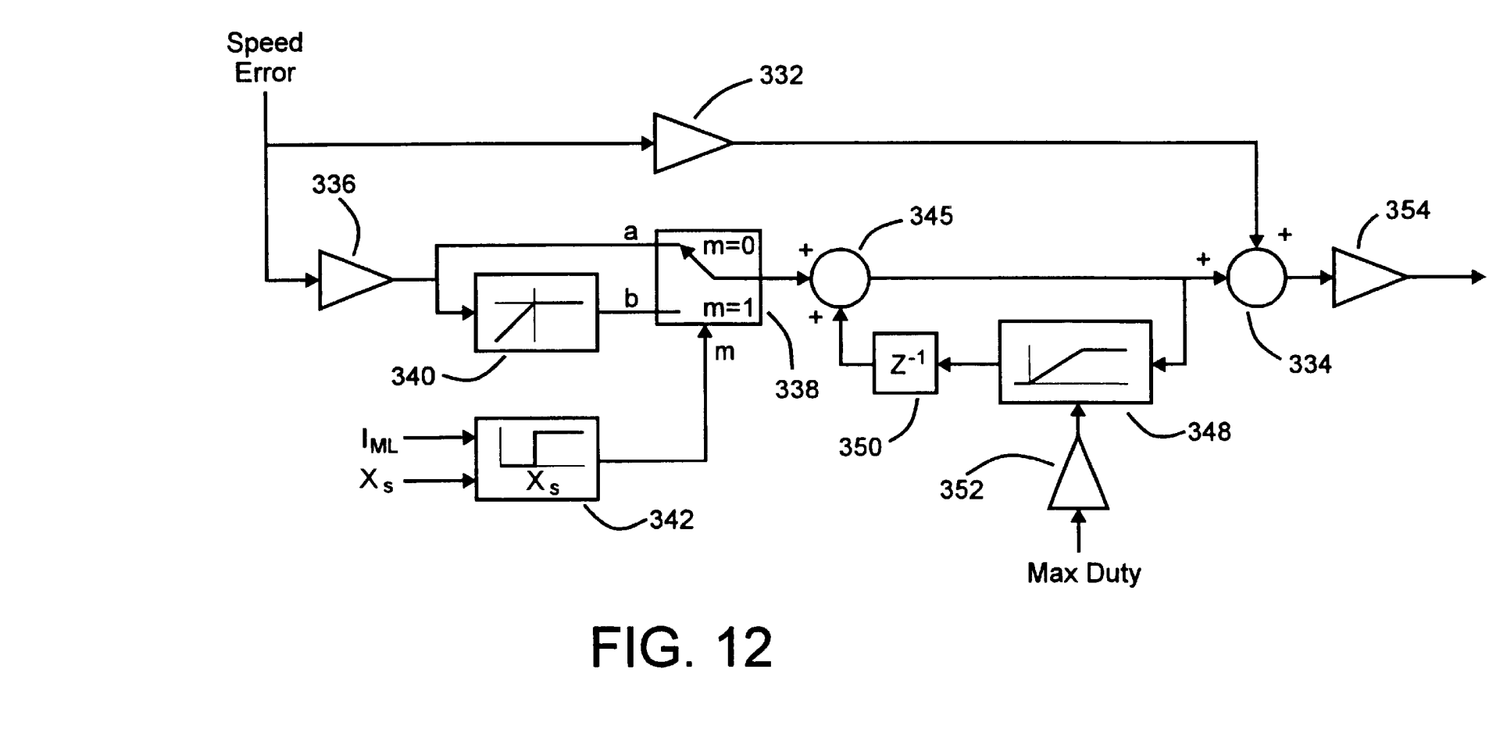
FIG. 12 shows further details of the P+I CONTROL block in the diagram of FIG. 11.

P+I CONTROL 330 is shown in FIG. 12. The Speed Error input signal from summing block 310 in FIG. 11 is provided in a proportional branch through a scaling amplifier 332 to a summing block 334. In the integral branch, the speed error input signal is first multiplied in a scaling amplifier 336. Next comes an implementation of anti-wind-up limiting based on motor current. The output of amplifier 336 is provided to one input "a" of a selecting switch 338, which also has another input "b". The output of amplifier 336 is provided to a function generator 340, the output of which is provided to input "b" of amplifier 338. Function generator 340 passes negative values of the input but provides zero output for positive values of the input, in the following manner. A comparator 342 compares motor current $I_{ML}$ with a maximum current reference $X_S$ and, on the basis of this comparison, provides a controlling signal to switch 338. As long as motor current $I_{ML}$ does not exceed $X_S$, the output of amplifier 336 is passed through input "a" of switch 338 to the output thereof. However, when motor current $I_{ML}$ exceeds $X_S$, the output of amplifier 336 is modified by function generator 340 to the "b" input so that only negative values from amplifier 336 are passed through switch 338, and only downward integration is performed.

The output of switch 338 is provided to a summing block 345 of an integrating function. The output of summing block 345 is provided as the other input to summing block 334 to be combined therein with the output of the proportional branch. In addition, it is fed back positively through a function generator 348 and a delay block 350 to be added in summing block 345. Function block 348 provides an anti-wind-up function on duty cycle by limiting the output thereof to a value which is a multiple of Max Duty, provided thereto through a scaling amplifier 352. This is done because, with reference to FIG. 11, the output signal Duty is limited to Max Duty; and this could produce integrator wind-up while that limitation is active. As previously mentioned, signals from the proportional and integral branches are added in summing block 334; and the output thereof is scaled in an output scaling amplifier 354.

I claim:

1. A vehicle power steering system in which an electric motor drives a pump at a variable speed to provide power steering fluid at a variable flow to meet power steering operation demands, the system having a speed control for the electric motor comprising, in combination:

sensor means for providing a power steering load signal;

a function generator responsive to the power steering load signal to provide a command speed signal which switches at a switch-point load value in a switching region of the power steering load signal between a low speed for standby operation and a higher speed to supply the power steering operation demands;

a power steering fluid temperature sensor;

means for modifying the switch-point load value in response to the power steering fluid temperature sensor to compensate for temperature dependent losses; and means for sensing motor speed and controlling electric power to the motor in response thereto to vary the speed of the electric motor in the direction of the command speed signal.

2. The vehicle power steering system of claim 1 in which:

the function generator provides a command speed signal which switches at a first switch-point pressure in the switching region from a low speed for standby operation to a higher speed to supply the power steering operation demands and switches at a second switch-point pressure, lower than the first switch-point pressure, from the higher speed to the lower speed for standby operation; and the modifying means modifies at least one of the first and second switch-point pressure values in response to the power steering fluid temperature sensor to compensate for temperature dependent losses.

3. The vehicle power steering system of claim 2 in which the modifying means modifies the first switch-point pressure value in response to the power steering fluid temperature sensor and a motor speed signal to compensate for temperature and speed dependent losses.

4. The vehicle power steering system of claim 2 in which the modifying means modifies the second switch-point pressure value in response to the power steering fluid temperature sensor and a motor speed signal to compensate for temperature and speed dependent losses.

5. The vehicle power steering system of claim 2 in which the modifying means modifies both the first and second switch-point pressure values in response to the power steering fluid temperature sensor and a motor speed signal to compensate for temperature and speed dependent losses.

* * * * *